United States Patent [19]

Tanamura et al.

[11] Patent Number: 5,280,775
[45] Date of Patent: Jan. 25, 1994

[54] FUEL VAPOR CONTROL VALVE DEVICE

[75] Inventors: Toru Tanamura; Tsuyoshi Sawada; Hideo Watanabe; Takeaki Nakajima, all of Saitama, Japan

[73] Assignees: Toyo Denso Kabushiki Kaisha; Honda Giken Kogyo Kabushiki Kaisha, both of Tokyo, Japan

[21] Appl. No.: 874,378

[22] Filed: Apr. 27, 1992

[30] Foreign Application Priority Data

Apr. 27, 1991 [JP] Japan .............................. 3-038883[U]

[51] Int. Cl.⁵ ................................. F02M 33/02
[52] U.S. Cl. ................................. 123/518; 137/587
[58] Field of Search ............... 137/587; 123/516, 518, 123/519, 520, 521

[56] References Cited

U.S. PATENT DOCUMENTS

| | | |
|---|---|---|
| 4,127,097 | 11/1978 | Takimoto . |
| 4,153,025 | 5/1979 | Thornburgh . |
| 4,343,281 | 8/1982 | Uozumi et al. ............... 123/520 |
| 4,577,607 | 3/1986 | Nishio . |
| 4,703,737 | 11/1987 | Cook et al. . |
| 4,714,193 | 12/1987 | Yogo ............................. 123/516 |
| 4,741,317 | 5/1988 | Yost . |
| 4,815,436 | 3/1989 | Sasaki et al. ................. 123/520 |
| 4,819,607 | 4/1989 | Aubel ............................. 123/519 |
| 4,862,856 | 9/1989 | Yokoe et al. ................. 123/520 |
| 4,872,439 | 10/1989 | Sonoda et al. ............... 123/519 |
| 4,887,578 | 12/1989 | Woodcock et al. .......... 123/516 |
| 4,903,672 | 2/1990 | MacKinnon .................. 123/520 |
| 5,027,780 | 7/1991 | Uranishi et al. ............. 123/516 |
| 5,054,508 | 10/1991 | Benjey ............................. 137/587 |
| 5,056,494 | 10/1991 | Kayanuma ..................... 123/516 |
| 5,099,880 | 3/1992 | Szlaga et al. .................. 137/587 |
| 5,123,459 | 6/1992 | Toshihiro ....................... 137/587 |
| 5,174,265 | 12/1992 | Sekine ........................... 123/520 |

FOREIGN PATENT DOCUMENTS

| | | |
|---|---|---|
| 53-74620 | 3/1978 | Japan . |
| 58-87578 | 12/1984 | Japan . |
| 60-60382 | 4/1985 | Japan . |
| 60-69380 | 4/1985 | Japan . |
| 60-73181 | 4/1985 | Japan . |

*Primary Examiner*—E. Rollins Cross
*Assistant Examiner*—Thomas Moulis
*Attorney, Agent, or Firm*—Birch, Stewart, Kolasch & Birch

[57] ABSTRACT

A constant-pressure operating valve is provided to allow communication between a canister passage connected to a canister and a fuel tank passage connected to a fuel tank and to selectively terminate the communication between them. The constant-pressure operating valve is opened when the internal pressure of the fuel tank exceeds a predetermined value, thereby allowing the fuel vapor in the fuel tank to flow into the canister. Further, when the engine is in operation, the constant-pressure operating valve can be opened, for example, through the action of solenoid, irrespective of the internal pressure of the fuel tank. If the constant-pressure operating valve is opened when the internal pressure of the fuel tank is less than the predetermined value, then the fuel vapor in the fuel tank is drawn into the canister, and so even if the lid of the fuel tank is opened in this condition, the amount of the vapor escaping into the atmosphere is limited.

8 Claims, 3 Drawing Sheets

FUEL VAPOR CONTROL VALVE DEVICE

BACKGROUND OF THE INVENTION

1. Field of the Invention

The present invention relates to a fuel vapor control valve device adapted to be fitted between a fuel tank and a canister for storing fuel vapor therein.

2. Description of Related Art

As a valve device of the kind specified, there is known a fuel vapor control valve arrangement comprising a canister passage communicating with a fuel tank, a first communication passage and a second communication passage which connect the canister passage and the fuel tank passage, a constant-pressure operating valve for opening and closing the first communication passage, and a differential pressure operating valve for opening and closing the second communication passage, the arrangement being made such that the constant-pressure operating valve opens the first communication passage when the internal pressure of the fuel tank exceeds a predetermined value, thereby allowing the fuel vapor to flow from the fuel tank into the canister, and the differential pressure operating valve opens the second communication passage only when the internal pressure of the canister becomes higher than that of the fuel tank and the difference between the internal pressure of the canister and that of the fuel tank exceeds a predetermined value, thereby allowing the fuel vapor to flow from the canister back into the fuel tank. Further, the constant-pressure operating valve is of an absolute pressure operating type adapted to be actuated on the basis of the atmospheric pressure wherein its valve body is formed by a diaphragm, one side of which faces the first communication passage and the fuel tank passage, and the other side of which is open to the atmosphere.

In case of the above-mentioned construction, however, the constant-pressure operating valve and the differential pressure operating valve are arranged to be independently and automatically opened and closed in response to change in the internal pressure of the fuel tank. Therefore, when the internal pressure of the fuel tank is less than a predetermined value, there occurs a condition that although the constant-pressure operating valve is closed, the fuel tank is filled with fuel vapor to some degree. If a lid closing a filling port of the fuel tank is opened in this condition, for example, for refuelling purposes, the fuel vapor filling the space in the fuel tank may exhaust into the open air as refuelling proceeds. Hereupon, it becomes necessary to reduce the amount of emission of fuel vapor into the atmosphere in such a case. To achieve this purpose, the fuel in the fuel tank is always sent into the canister irrespective of the internal pressure of the fuel tank until the engine is stopped for refuelling to thereby reduce the amount of fuel vapor remaining in the fuel tank when the lid is opened as far as possible.

To meet the above requirements, the fuel tank passage should communicate with the canister passage by a third communication passage at a place separate from the constant-pressure operating valve and the differential pressure operating valve, and open and close the third communication passage by a third valve which is opened when the engine is in operation. However, provision of such a third communication passage and third valve causes an increase in the number of component parts and also an increase in the size of the entire fuel vapor control valve device because of the need for further extension of the canister passage and the fuel tank passage.

To solve the problems presented above, the invention of this application has for its principal object to always capture fuel vapor in the canister when the engine is in operation without having to provide a third valve separate from the constant-pressure operating valve and the differential pressure operating valve, and for its additional object to avoid an increase in the size of the fuel vapor control valve device in such a case.

SUMMARY OF THE INVENTION

According to a preferred aspect of the present invention, there is provided a fuel vapor control valve device adapted to be fitted between a canister and a fuel tank, the device comprising a canister passage communicating with a canister, a fuel tank passage communicating with a fuel tank, and a constant-pressure operating valve adapted to allow communication between the canister passage and the fuel tank passage and interrupt the communication between them. The constant-pressure operating valve is adapted to be opened when the internal pressure of the fuel tank exceeds a predetermined value thereby allowing the fuel vapor to flow from the fuel tank into the canister. The constant-pressure operating valve is provided with a compulsory valve opening means for opening the valve irrespective of the internal pressure of the fuel tank when the engine is in operation. Thus, when the engine is in operation, the compulsory valve opening means opens the constant-pressure operating valve irrespective of the internal pressure of the fuel tank so that the fuel vapor in the fuel tank is drawn into the canister. Therefore, even if the engine is stopped for refuelling, since the fuel vapor in the fuel tank is drawn into the canister until just before the engine is stopped, the amount of the vapor remaining in the fuel tank is reduced substantially so that even when the lid fitted to the filling port is opened for refuelling the amount of emission of the vapor into the atmosphere is limited.

The above-mentioned and other objects and features of the present invention will become apparent from the following detailed description and the accompanying drawings in which the preferred embodiment of the present invention is illustrated.

DETAILED DESCRIPTION OF THE PREFERRED EMBODIMENT

Figure 1:
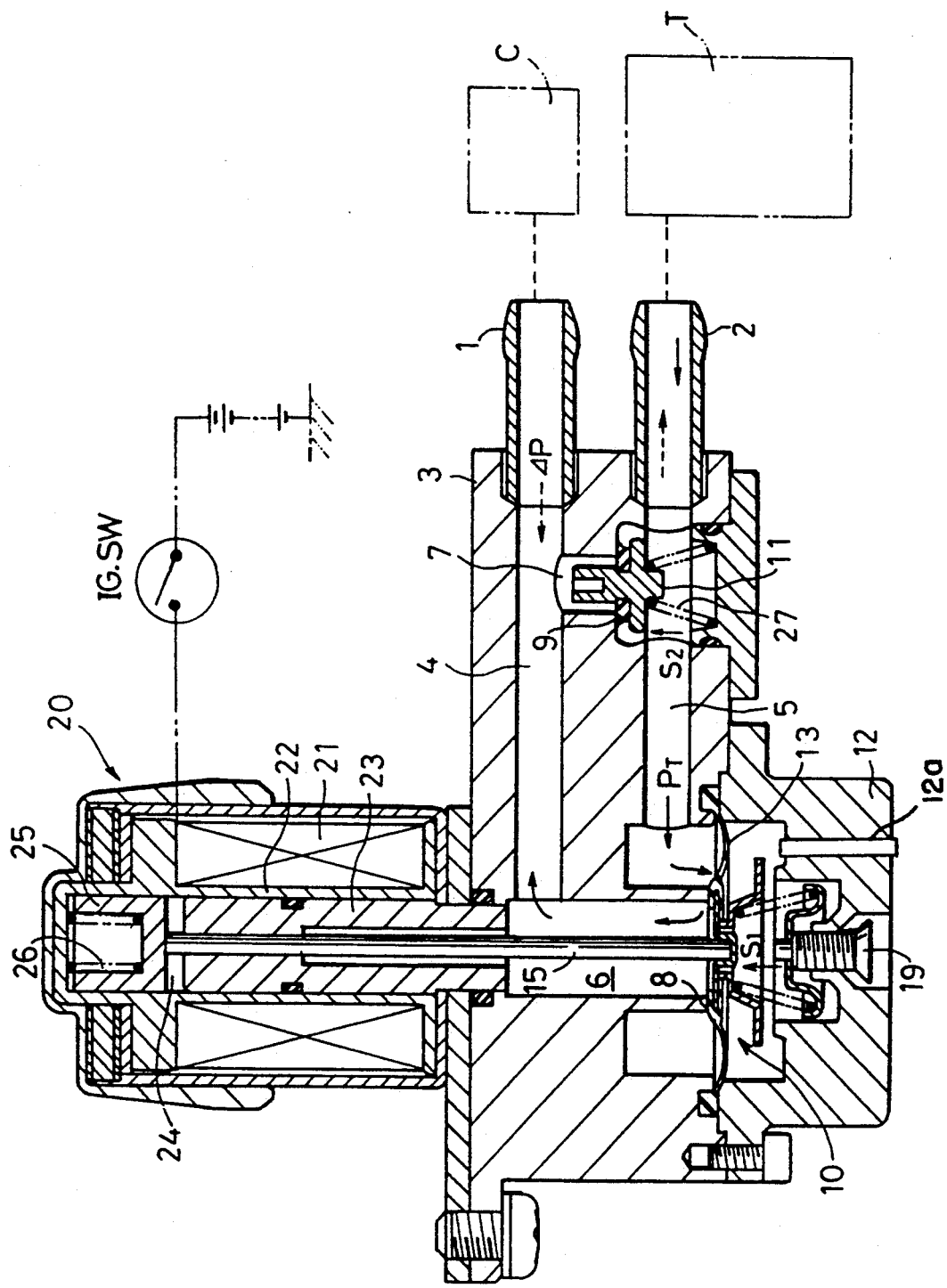
FIG. 1 is an overall sectional view of a fuel vapor control valve device according to the present invention.

FIG. 1 shows an overall section of the fuel vapor control valve device according to one embodiment constructed for use in an automobile.

Figure 2:
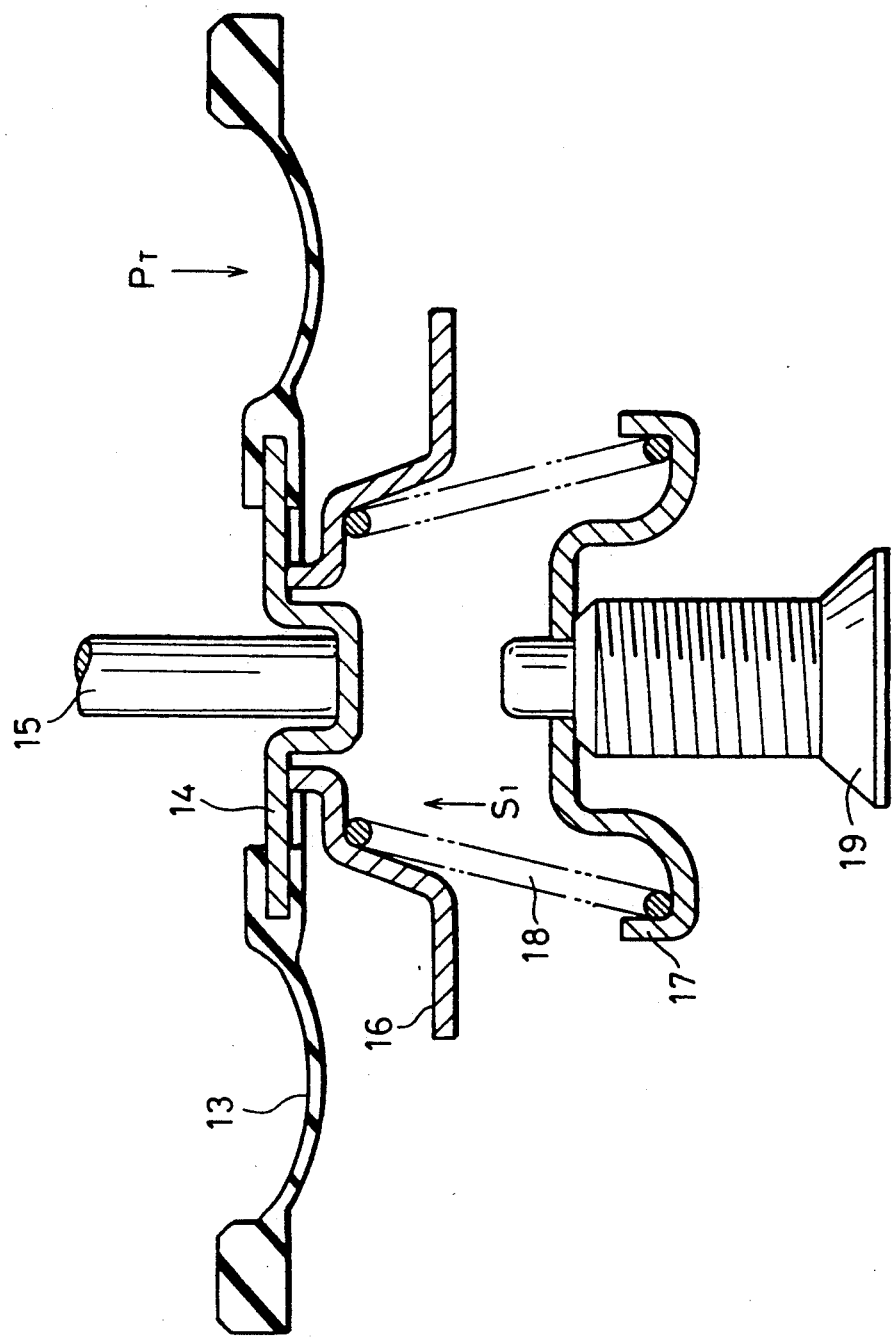
FIG. 2 is an enlarged sectional view showing only principal parts of a constant-pressure operating valve of the embodiment shown in FIG. 1.
Figure 3:
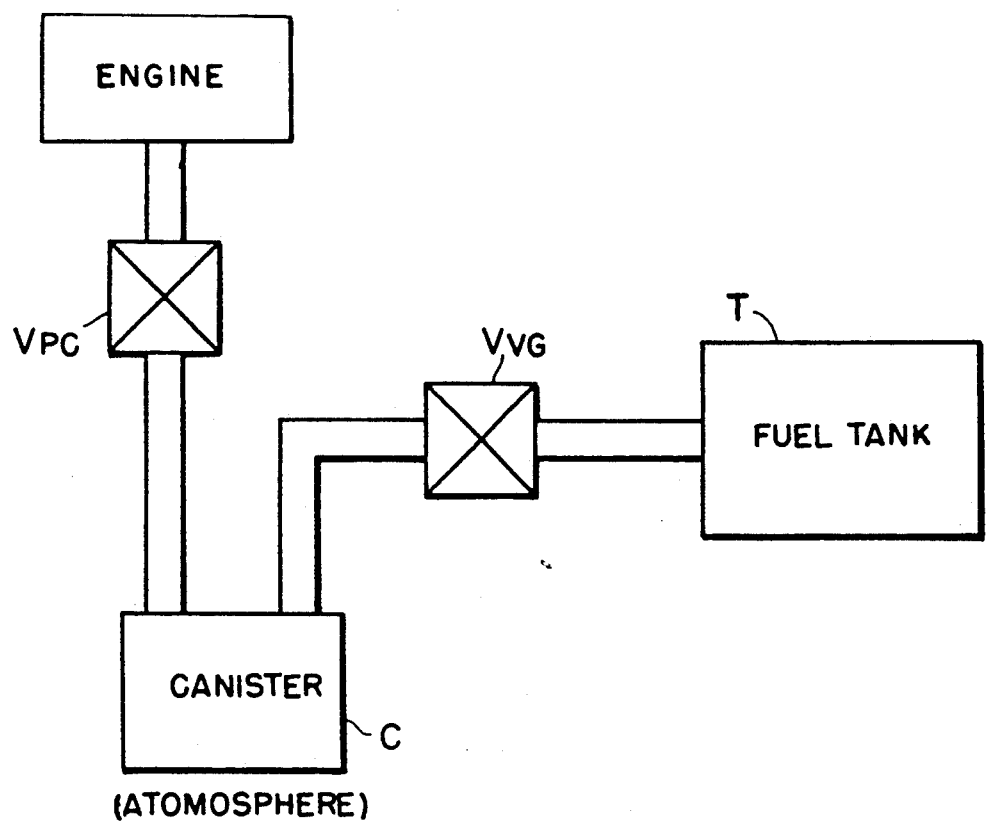
FIG. 3 is a block diagram showing schematically the condition of the fuel vapor control valve device in use.

FIG. 2 is an enlarged view of the constant-pressure operating valve shown in FIG. 1 and FIG. 3 is a schematic connection diagram of the fuel vapor control valve device in use. In FIG. 3, this fuel vapor control valve device $V_{VG}$ is connected between a fuel tank T and a canister C in the same manner as a conventional device. The canister C for vapor storage is connected through a purge control valve $V_{PC}$ to the engine. The purge control valve $V_{PC}$ is adapted to be closed when the engine is in an idling condition, thereby effecting control to prevent the air-fuel ratio from becoming too rich. In FIG. 1, the fuel vapor control valve device $V_{VG}$ is connected through joint pipes 1 and 2 to the canister C and the fuel tank T, respectively.

A housing 3 has a canister passage 4 and a fuel tank passage 5 formed therein in parallel with each other and which are connected to the joint pipes 1 and 2, respectively. The canister passage 4 communicates with the fuel tank passage 5 at two places including a first communication passage 6 and a second communication passage 7. A constant-pressure operating valve 10 and a differential pressure operating valve 11 have respective valve bodies arranged so that they can be seated on valve seats 8 and 9 formed on the side of or in proximity to the fuel tank passage 5 of the communication passages 6 and 7, respectively. The constant-pressure operating valve 10 and the differential pressure operating valve 11 constitute the fuel vapor control valve device $V_{VG}$. The differential pressure operating valve 11 is located upstream of the constant-pressure operating valve 10 (that is, the former is located closer to the fuel tank T and the canister C than the latter).

The first communication passage 6 extends through the housing 3 in a direction at right angles to the canister passage 4 and the fuel tank passage 5, respectively, and the end of the passage 6 which opens in the bottom of the housing 3 is covered by a cup 12. The cup 12 has a space formed therein and in which the constant-pressure operating valve 10 is mounted.

As is apparent from FIG. 2, the valve body of the constant-pressure operating valve 10 is formed by a diaphragm 13, and has at the central part thereof a plate 14 formed integrally with the diaphragm 13. Further, one end of a shaft 15 is brought into contact with the central part of the plate 14. The diaphragm 13 is made of a terpolymeric fluororubber having an excellent resistance to alcohol.

A first set spring 18, which is a coiled spring, is located in a compressed state between a retainer 16 formed integrally with the plate 14 and a retainer 17 provided towards the cup 12 so that the diaphragm 13 is biased by a set loading S1 in such a direction as to close the operating valve 10. The requirement for opening the constant-pressure operating valve 10 is that the internal pressure of the fuel tank T exceeds a predetermined value $P_T$ (that is, the set loading S1).

The retainer 17 is supported by an adjusting bolt 19 so that its height can be adjusted to thereby enable the set loading S1 or compression of the first set spring 18 to be adjusted as desired.

Referring to FIG. 1 again, the peripheral portion of the diaphragm 13 is held between the bottom of the housing 3 and the flange portion of the cup 12. The space enclosed by the diaphragm 13 and the cup 12 is kept open to the atmosphere through an air vent 12a formed in the cup 12.

When the diaphragm 13 is seated on the valve seat 8 by the biasing force of the first set spring 18, the communication between the fuel tank passage 5 and the first communication passage 6 is cut off so that the constant-pressure operating valve 10 is closed. Inversely, when the diaphragm 13 is unseated from the valve seat 8, the constant-pressure operating valve 10 is opened so that the fuel tank passage 5 communicates through the first communication passage 6 with the canister passage 4.

The shaft 15 passes through the first communication passage 6 and is supported by a solenoid 20 mounted on the upper surface of the housing 3 (the side of the housing 3 opposite and that on which cup 12 is fitted) so that it may be advanced to retracted. The solenoid 20 comprises a cylinder portion 22 having a coil 21 would thereon, a cylindrical stator core 23 fixedly mounted within the cylinder portion 22, and a moving core 25 with which the other end of the shaft 15 passing axially through the stator core 23 is brought into contact.

The moving core 25 is slidable within the cylinder portion 22 with an airgap 24 maintained between itself and one end of the stator core 23, and is biased by a return spring 26 towards the stator core 23. However, the resilient force of the return spring 26 is set at a value smaller than that of the first set spring 18.

The solenoid 20 is energized or deenergized by supplying electric current to the coil 21 or interrupting the supply of electric current thereto. When the solenoid 20 is energized, the moving core 25 is magnetically attracted to one end of the stator core 23, thus eliminating the airgap 24, so that the shaft 15 is moved downwards against the resilient force of the first set spring 18, thereby unseating the diaphragm 13. Since one end of the shaft 15 is held in contact with the valve seat 8 to open the constant-pressure operating valve 10 upon energization of the solenoid, the constant-pressure operating valve 10 is opened regardless of whether or not the internal pressure of the fuel tank T is higher than the predetermined value $P_T$.

Therefore, the constant-pressure operating valve 10 is controlled for opening and closing by energization and deenergization of the solenoid 20. In the case of this embodiment, when an ignition switch IG.SW (FIG. 1) is turned on, the coil 21 of the solenoid is supplied with an electric current at the same time, thereby opening the constant-pressure operating valve 10 and maintaining this condition thereafter when the engine is in operation. However, it is possible to obtain a variety of control patterns for opening and closing of the constant-pressure operating valve 10 as occasion demands by interlocking the supply of electric current to the coil 21 of the solenoid 20 with the change in internal pressure of the fuel tank T, or by supplying electric current to the coil 21 at intervals of predetermined traveling time thereby energizing and deenergizing the solenoid 20.

Further, one end of the shaft 15 is connected to the moving core 25 which is movable freely in the cylinder portion 22. Consequently, when the internal pressure of the fuel tank T is higher than the predetermined value $P_T$ during a deenergized condition of the solenoid 20, the diaphragm 13 is unseated from the valve seat 8 against the resilient force of the first set spring 18, thereby opening the constant-pressure operating valve 10. When the internal pressure of the fuel tank T is less than the predetermined value $P_T$, the diaphragm 13 is seated on the valve seat 8 by the resilient force of the first set spring 18, thereby closing the constant-pressure operating valve 10.

The differential pressure operating valve 11 is biased by a second set spring 27 in such a valve closing direction as to permit it to be seated on the valve seat 9. It's valve body is made of a terpolymetric fluororubber having an excellent resistance to alcohol in the same manner as the diaphragm 13.

The differential pressure operating valve 11 is unseated from the valve seat 9, that is, opened only when the internal pressure of the canister C becomes higher than that in the fuel tank T and the difference in the internal pressure between the canister C and the tank T, (i.e., the differential pressure P) exceeds the set loading S2 of the second set spring 27 with the result that the fuel vapor flows from the canister C back to the fuel tank T. The requirement for closing the differential pressure operating valve 11 is that the differential pressure P is less than the set loading S2.

The operation of this embodiment will now be described below. First referring to FIG. 1, in the condition that the engine is stopped, if the internal pressure of the fuel tank T is higher than the predetermined value $P_T$, then the constant-pressure operating valve 10 is opened and the differential pressure operating valve 11 is closed. As a result, the fuel vapor in the fuel tank T flows through the fuel tank passage 5, the first communication passage 6 and the canister passage 4 into the canister C and is captured therein. If the internal pressure of the fuel tank T is lower than the predetermined value $P_T$, then the constant-pressure operating valve 10 is closed, thus blocking the first communication passage from the fuel tank passage 5. If at that time, the internal pressure of the fuel tank T is higher than that of the canister C or even if the internal pressure of the canister C is higher than that of the fuel tank T, but the differential pressure P is less than the set loading S2, then the differential pressure operating valve 11 is closed, thereby cutting off the communication between the fuel tank T and the canister C.

When the differential pressure P becomes more than the set loading S2, the differential pressure operating valve 11 is opened so that the fuel vapor flows from the canister C back into the fuel tank T. Further, since the differential pressure operating valve 11 is located upstream of the constant-pressure operating valve 10, even if the latter is closed, there is no backward flow of the fuel vapor from the canister C into the fuel tank T.

Further, when the engine is in operation, simultaneously with turning-on of the ignition switch IG.SW, the solenoid 20 is energized at the same time so that the constant-pressure operating valve 10 is automatically opened. Consequently, as is apparent from FIG. 3, when the engine is in operation and the purge control valve $V_{PC}$ is opened, the fuel vapor in the fuel tank T is drawn through the canister C into the engine by the action of the negative pressure generated during the suction stroke of the engine. As a result, the internal pressure of the fuel tank T can be reduced so that the amount or emission of the fuel vapor into the atmosphere can be reduced. At that time, the fuel vapor flows through the canister C, but is not adsorbed therein. Further, when the constant-pressure operating valve 10 is maintained open, the differential pressure operating valve 11 is closed.

Further, as mentioned hereinabove, the purge control valve $V_{PC}$ is closed during idling of the engine so that the fuel vapor is not drawn into the engine. However, since the constant-pressure operating valve 10 is opened when the engine is on to allow the fuel tank T to communicate with the canister C, even when the internal pressure of the fuel tank T is less than the predetermined value $P_T$, the fuel vapor emitted from the fuel tank T until just before the engine is stopped is drawn into the canister C. Therefore, the tendency of the fuel tank T to be filled with fuel vapor is reduced, and even if the engine of the vehicle is stopped and the lid is opened for refuelling, the amount of fuel vapor remaining in the fuel tank T is already reduced substantially, the amount of emission of the fuel vapor into the atmosphere can be substantially reduced.

Furthermore, the constant-pressure operating valve 10 fulfills not only the constant pressure operating function wherein it is opened only when the internal pressure of the fuel tank T exceeds the predetermined value $P_T$ as in the prior art, but also the function of a solenoid-actuated valve which opens and closes the valve irrespective of the internal pressure of the fuel tank T. Therefore, the same result as that obtainable in the case where a solenoid-actuated valve is provided as a third valve in addition to the constant-pressure operating valve 10 and the differential pressure operating valve 11 can be obtained. Moreover, there is no need to provide a solenoid-actuated valve as a third valve separately from the constant-pressure operating valve 10, and also it is unnecessary to provide a third communication passage for the third valve. Accordingly, in spite of the fact that this fuel vapor control valve is provided substantially with the first, second and third valves, an increase in the number of parts and also increase in cost can be restrained. Further, since there is no need for extension of the canister passage 4 and the fuel tank passage 5 due to provision of the third valve and the third communication passage, an increase in the size of the entire device can be prevented, thereby rendering a relatively compact device.

Furthermore, since the operation of the solenoid 20 is interlocked with the ignition switch IG.SW, it is ensured that the constant-pressure operating valve 10 is opened when the engine is in operation.

Further, the present invention is not to be limited to the above-mentioned embodiment, and various embodiments can be made. For example, as a method of detecting the operating condition of the engine, negative pressure generated in a suction stroke or the number of revolutions of the crank or the like may be used.

Yet further, as a construction of the constant-pressure operating valve and the means for automatically opening the valve it is possible, for example, to use a flap valve as the constant-pressure operating valve driven by an electric motor.

We claim:

1. A fuel vapor control valve device fitted between a canister and a fuel tank, the device comprising:
   a housing;
   a canister passage and a fuel tank passage which are formed in the housing and which communicate with the canister and the fuel tank, respectively; and
   a constant-pressure operating valve for selectively enabling communication between the canister passage and the fuel tank passage such that the constant-pressure operating valve is opened when the internal pressure of the fuel tank exceeds a predetermined value, thereby allowing the vapor to flow from the fuel tank into the canister, the constant-pressure operating valve including a compulsory valve opening means for opening the valve irrespective of the internal pressure of the fuel tank, wherein the compulsory valve opening means is a solenoid, and the solenoid opens or closes the constant-pressure operating valve through an interlocking member adapted to be actuated in response to energization and deenergization of the solenoid.

2. The fuel vapor control valve device according to claim 1, wherein the solenoid is interlocked with an ignition switch and energized when the switch is turned on and deenergized when the switch is turned off, and the interlocking member is adapted to be moved in such a direction as to open the constant-pressure operating valve when the solenoid is energized, and is movable freely relative to the solenoid which is deenergized.

3. The fuel vapor control valve device according to claim 2, wherein the constant-pressure operating valve is provided with a spring means for biasing the valve in a valve closing direction, said spring means closing the constant-pressure operating valve when the internal pressure of the tank is less than a predetermined value and opening the valve when the internal pressure is more than the predetermined value, such that the constant-pressure operating valve can also be opened by movement of the interlocking member due to energization of the solenoid irrespective of the internal pressure of the fuel tank.

4. The fuel vapor control valve device according to claim 2, wherein the canister passage and the fuel tank passage are formed in parallel with each other in the housing, and first and second communication passage are formed between the canister passage and the tank passage, the first communication passage being adapted to be opened and closed by the constant-pressure operating valve, and the second communication passage being adapted to be opened and closed by the differential pressure operating valve, such that when the difference between the internal pressure of the canister and that of the fuel tank reaches a predetermined value the differential pressure operating valve is opened, thereby enabling the fuel vapor to flow from the canister back into the fuel tank, a shaft forming the interlocking member being provided in the first communication passage so that it can be advanced and retracted freely, one end of the shaft being held in contact with the valve body of the constant-pressure operating valve, and the other end thereof being supported by the solenoid in a freely movable condition when the solenoid is deenergized, the shaft being arranged to be moved compulsorily in such a direction as to open the constant-pressure operating valve when the solenoid is energized.

5. A fuel vapor control device fitted between a canister and a fuel tank, the device comprising:

a canister passage directly connected to the canister;

a fuel tank passage directly connected to the fuel tank;

a constant pressure operating valve for selectively connecting said canister passage with said fuel tank passage, wherein said constant pressure operating valve is automatically opened when an internal pressure of the fuel tank exceeds a predetermined value thereby creating an equilibrium between the internal pressure of the fuel tank and an internal pressure of the canister; and solenoid means for directly opening said constant pressure operating valve upon energization of said solenoid means, said solenoid means overriding the automatic opening of said constant pressure operating valve.

6. The fuel vapor control device according to claim 1, wherein said solenoid means includes an interlocking member for connecting said constant pressure operating valve to said solenoid means, whereby said constant pressure operating valve is opened and closed in response to energization and deenergization of said solenoid means, respectively.

7. The fuel vapor control device according to claim 2, wherein said constant pressure operating valve includes spring means for normally biasing said constant pressure operating valve in a valve closing direction, said spring means being compressed to thereby open said constant pressure operating valve when an internal pressure of said fuel tank is greater than the normal biasing force of said spring means, and wherein said constant pressure operating valve is opened when an energized force of said interlocking member is greater than the normal biasing force of said spring.

8. The fuel vapor control device according to claim 1, further including a differential pressure operating valve positioned intermediate said canister passage and said fuel tank passage and normally seated against said fuel tank passage, said differential pressure operating valve being automatically opened when the internal pressure of the canister is greater than the internal pressure in the fuel tank and the differential pressure between the fuel tank and the canister is greater than the normal biasing force of said differential pressure operating valve.

* * * * *